United States Patent
Feng et al.

(10) Patent No.: US 11,394,472 B2
(45) Date of Patent: Jul. 19, 2022

(54) DOUBLE-ANTENNA RADIO FREQUENCY POWER DETECTION CIRCUIT AND APPARATUS, AND MOBILE TERMINAL

(71) Applicant: JRD Communication (Shenzhen) LTD., Shenzhen (CN)

(72) Inventors: Xu Feng, Shenzhen (CN); Zhaosheng Zhang, Shenzhen (CN); Fan Huang, Shenzhen (CN); Tao Mao, Shenzhen (CN); Bifeng Hu, Shenzhen (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 199 days.

(21) Appl. No.: 16/764,889

(22) PCT Filed: Dec. 7, 2018

(86) PCT No.: PCT/CN2018/119714
§ 371 (c)(1),
(2) Date: May 18, 2020

(87) PCT Pub. No.: WO2019/109994
PCT Pub. Date: Jun. 13, 2019

(65) Prior Publication Data
US 2020/0322066 A1  Oct. 8, 2020

(30) Foreign Application Priority Data
Dec. 8, 2017 (CN) .......................... 201711296728.3

(51) Int. Cl.
*H04B 17/10* (2015.01)
*H04B 1/40* (2015.01)

(52) U.S. Cl.
CPC ............. *H04B 17/102* (2015.01); *H04B 1/40* (2013.01)

(58) Field of Classification Search
CPC ... H04B 1/38; H04B 1/40; H04B 1/44; H04B 17/10; H04B 1/12; H04B 17/102; H01Q 1/38; H01Q 21/24
See application file for complete search history.

(56) References Cited

U.S. PATENT DOCUMENTS 7,149,489 B2   12/2006  Hong
7,415,295 B2    8/2008  Tran
(Continued)

FOREIGN PATENT DOCUMENTS

CN   1429045   7/2003
CN   1833373   9/2006
(Continued)

OTHER PUBLICATIONS

International Search Report and the Written Opinion dated Feb. 21, 2019 From the International Searching Authority Re. Application No. PCT/CN2018/119714 and Its Translation of Search Report Into English. (10 Pages).

*Primary Examiner* — Thanh C Le

(57) ABSTRACT

A double-antenna radio frequency power detection circuit comprises a radio frequency transceiver, a switching module, a first power detection module, a second power detection module, a first antenna, and a second antenna. The switching module outputs a radio frequency signal received from the radio frequency transceiver, to the first power detection module or the second power detection module according to a switching signal. The first power detection module or the second power detection module respectively detects the transmit power of the radio frequency signal passing through the first antenna or the second antenna, and gives a feedback to the radio frequency transceiver.

16 Claims, 3 Drawing Sheets

(56) References Cited

U.S. PATENT DOCUMENTS

| | | | |
|---|---|---|---|
| 9,559,791 B2 | 1/2017 | Chen et al. | |
| 2007/0075803 A1* | 4/2007 | Kemmochi | H04B 1/0057 333/132 |
| 2008/0212552 A1* | 9/2008 | Fukamachi | H04B 1/006 370/343 |
| 2011/0006841 A1* | 1/2011 | Wyse | H03F 3/211 330/124 R |
| 2019/0356278 A1* | 11/2019 | Smith, Jr. | H04B 7/0868 |

FOREIGN PATENT DOCUMENTS

| | | |
|---|---|---|
| CN | 101188462 | 5/2008 |
| CN | 101945417 | 1/2011 |
| CN | 104270166 | 1/2015 |
| CN | 105576386 | 5/2016 |
| CN | 106130664 | 11/2016 |
| CN | 106209267 | 12/2016 |
| CN | 106877914 | 6/2017 |
| CN | 107707264 | 2/2018 |
| CN | 108111176 | 6/2018 |
| KR | 2006-0007814 | 1/2006 |
| KR | 2015-0007016 | 1/2015 |
| WO | WO 2019/109994 | 6/2019 |

* cited by examiner

DOUBLE-ANTENNA RADIO FREQUENCY POWER DETECTION CIRCUIT AND APPARATUS, AND MOBILE TERMINAL

RELATED APPLICATIONS

This application is a National Phase of PCT Patent Application No. PCT/CN2018/119714 having International filing date of Dec. 7, 2018, which claims the benefit of priority of Chinese Patent Application No. 201711296728.3 filed on Dec. 8, 2017. The contents of the above applications are all incorporated by reference as if fully set forth herein in their entirety.

FIELD AND BACKGROUND OF THE INVENTION

The present invention relates to communication technologies, and more particularly to a double-antenna RF power detection circuit, apparatus and mobile terminal.

At present, in the mobile communication, the transmission power detection of a radio frequency (RF) transceiver primarily utilizes a power coupler for power feedback. However, in a case that the RF transceiver has only one power feedback pin, such as TX_detection_path_input (RF_TXDET) pin, provided thereon, and RF signals are transmitted by two antennas, (for example, TX frequencies are divided into two bands and each of a low band (below 1 GHz) and an intermediate or high band (above 1 GHz) is directed to one antenna switch), it needs an attenuation network for monitoring in real time transmission power of the two transmission links.

Therefore, the existing arts are needed to be improved.

SUMMARY OF THE INVENTION

The embodiments of the present application provide a double-antenna radio frequency power detection circuit, apparatus and mobile terminal, which can realize power detection of double-antenna RF links, not only satisfies the demands on signal transmission of two antennas but also can monitor in real time the transmission power of signals transmitted using different antennas, so as to adjust in real time the output power of the RF signal.

In a first aspect, an embodiment of the present application provides a double-antenna radio frequency (RF) power detection circuit, including a RF transceiver, a switching module, a first power detection module, a second power detection module, a first antenna and a second antenna, wherein the first power detection module connects to the first antenna and the second power detection module connects to the second antenna; wherein the RF transceiver outputs a RF signal to the switching module, the switching module outputs the RF signal to the first power detection module or the second power detection module according to a received switching signal, the first power detection module or the second power detection module detects transmission power of the RF signal transmitted by the first antenna or the second antenna and gives a feedback to the RF transceiver.

In the circuit, the switching module includes a single-pole double-throw switch, a first end of which connects to a RF_TXDET end of the RF transceiver, a second end of which connects to the first power detection module and a third end of which connects to the second power detection module.

In the circuit, the first power detection module includes a first attenuating unit and a first switching unit, and wherein when the switching module outputs the RF signal to the first power detection module, the RF signal is outputted to the first antenna by the first switching unit and power of the RF signal is fed back by the first attenuating unit.

In the circuit, the first attenuating unit connects to the second end of the single-pole double-throw switch and the first switching unit and the first switching unit connects to the first antenna.

In the circuit, the second power detection module includes a second attenuating unit and a second switching unit, and wherein when the switching module outputs the RF signal to the second power detection module, the RF signal is outputted to the second antenna by the second switching unit and power of the RF signal is fed back by the second attenuating unit.

In the circuit, the second attenuating unit connects to the third end of the single-pole double-throw switch and the second switching unit and the second switching unit connects to the second antenna.

In the circuit, the first attenuating unit includes a first resistor, a second resistor and a third resistor, the first switching unit includes a first antenna switch having a built-in coupler, the first power detection module further includes a first grounded resistor and a second grounded resistor;

one end of the first resistor connects to the second end of the single-pole double-throw switch and one end of the second resistor, another end of the first resistor is grounded; another end of the second resistor connects to one end of the third resistor and the first antenna switch; another end of the third resistor is grounded; the first antenna switch further connects to one end of the first grounded resistor and a first elastic sheet of the first antenna, one end of the second grounded resistor connects to a second elastic sheet cooperating with the first elastic sheet, both of another end of the first grounded resistor and another end of the second grounded resistor are grounded.

In the circuit, the second attenuating unit includes a fourth resistor, a fifth resistor and a sixth resistor, the second switching unit includes an external coupler and a second antenna switch, the second power detection module further includes a third grounded resistor and a fourth grounded resistor;

one end of the fourth resistor connects to the third end of the single-pole double-throw switch and one end of the fifth resistor, another end of the fourth resistor is grounded; another end of the fifth resistor connects to one end of the sixth resistor and a first end of the external coupler; the sixth resistor is grounded; a second end of the external coupler connects to the second antenna switch, a third end of the external coupler connects to a first end of the third grounded resistor and a third elastic sheet of the second antenna, one end of the fourth grounded resistor connects to a fourth elastic sheet cooperating with the third elastic sheet, both of another end of the third grounded resistor and another end of the fourth grounded resistor are grounded.

In the circuit, resistance of the first resistor, the second resistor and the third resistor ranges from $10\Omega$ to $250\Omega$.

In the circuit, resistance of the fourth resistor, the fifth resistor and the sixth resistor ranges from $10\Omega$ to $250\Omega$.

In a second aspect, an embodiment of the present application provides a double-antenna radio frequency (RF) power detection apparatus, including a printed circuit board (PCB) and a double-antenna RF power detection circuit disposed on the PCB, the double-antenna RF power detection circuit including:

a RF transceiver, a switching module, a first power detection module, a second power detection module, a first antenna and a second antenna, the first power detection module connecting to the first antenna, the second power detection module connecting to the second antenna, wherein the RF transceiver outputs a RF signal to the switching module, the switching module outputs the RF signal to the first power detection module or the second power detection module according to a received switching signal, the first power detection module or the second power detection module detects transmission power of the RF signal transmitted by the first antenna or the second antenna and gives a feedback to the RF transceiver.

In a third aspect, an embodiment of the present application provides a mobile terminal, including a double-antenna radio frequency (RF) power detection apparatus including a printed circuit board (PCB) and a double-antenna RF power detection circuit disposed on the PCB, the double-antenna RF power detection circuit including:

a RF transceiver, a switching module, a first power detection module, a second power detection module, a first antenna and a second antenna, the first power detection module connecting to the first antenna, the second power detection module connecting to the second antenna, wherein the RF transceiver outputs a RF signal to the switching module, the switching module outputs the RF signal to the first power detection module or the second power detection module according to a received switching signal, the first power detection module or the second power detection module detects transmission power of the RF signal transmitted by the first antenna or the second antenna and gives a feedback to the RF transceiver, wherein the RF transceiver connects to the switching module, the switching module connects to the first antenna via the first power detection module and connects to the second antenna via the second power detection module.

In the mobile terminal, the switching module includes a single-pole double-throw switch, a first end of which connects to a RF_TXDET end of the RF transceiver, a second end of which connects to the first power detection module and a third end of which connects to the second power detection module.

In the mobile terminal, the first power detection module includes a first attenuating unit and a first switching unit, and wherein when the switching module outputs the RF signal to the first power detection module, the RF signal is outputted to the first antenna by the first switching unit and power of the RF signal is fed back by the first attenuating unit.

In the mobile terminal, the first attenuating unit connects to the second end of the single-pole double-throw switch and the first switching unit and the first switching unit connects to the first antenna.

In the mobile terminal, the second power detection module includes a second attenuating unit and a second switching unit, and wherein when the switching module outputs the RF signal to the second power detection module, the RF signal is outputted to the second antenna by the second switching unit and power of the RF signal is fed back by the second attenuating unit.

In the mobile terminal, the second attenuating unit connects to the third end of the single-pole double-throw switch and the second switching unit and the second switching unit connects to the second antenna.

In the mobile terminal, the first attenuating unit includes a first resistor, a second resistor and a third resistor, the first switching unit includes a first antenna switch having a built-in coupler, the first power detection module further includes a first grounded resistor and a second grounded resistor;

one end of the first resistor connects to the second end of the single-pole double-throw switch and one end of the second resistor, another end of the first resistor is grounded; another end of the second resistor connects to one end of the third resistor and the first antenna switch; another end of the third resistor is grounded; the first antenna switch further connects to one end of the first grounded resistor and a first elastic sheet of the first antenna, one end of the second grounded resistor connects to a second elastic sheet cooperating with the first elastic sheet, both of another end of the first grounded resistor and another end of the second grounded resistor are grounded.

In the mobile terminal, the second attenuating unit includes a fourth resistor, a fifth resistor and a sixth resistor, the second switching unit includes an external coupler and a second antenna switch, the second power detection module further includes a third grounded resistor and a fourth grounded resistor;

one end of the fourth resistor connects to the third end of the single-pole double-throw switch and one end of the fifth resistor, another end of the fourth resistor is grounded; another end of the fifth resistor connects to one end of the sixth resistor and a first end of the external coupler; the sixth resistor is grounded; a second end of the external coupler connects to the second antenna switch, a third end of the external coupler connects to a first end of the third grounded resistor and a third elastic sheet of the second antenna, one end of the fourth grounded resistor connects to a fourth elastic sheet cooperating with the third elastic sheet, both of another end of the third grounded resistor and another end of the fourth grounded resistor are grounded.

In the mobile terminal, resistance of the first resistor, the second resistor and the third resistor ranges from $10\Omega$ to $250\Omega$.

Compared to the existing art, in the double-antenna RF power detection circuit, apparatus and mobile terminal provided in the embodiments of the present application, the double-antenna RF power detection circuit includes a RF transceiver, a switching module, a first power detection module, a second power detection module, a first antenna and a second antenna, wherein the first power detection module connects to the first antenna and the second power detection module connects to the second antenna; wherein the RF transceiver outputs a RF signal to the switching module, the switching module outputs the RF signal to the first power detection module or the second power detection module according to a received switching signal, the first power detection module or the second power detection module detects transmission power of the RF signal transmitted by the first antenna or the second antenna and gives a feedback to the RF transceiver. The embodiments of the present application can realize power detection of double-antenna RF links, not only satisfies the demands on signal transmission of two antennas but also can monitor in real time the transmission power of signals transmitted using different antennas, so as to adjust in real time the output power of the RF signal.

DESCRIPTION OF SPECIFIC EMBODIMENTS OF THE INVENTION

The present application provides a double-antenna radio frequency (RF) power detection circuit, apparatus and mobile terminal, which can realize power detection of double-antenna RF links, not only satisfies the demands on signal transmission of two antennas but also can monitor in real time the transmission power of signals transmitted using different antennas, so as to adjust in real time the output power of the RF signal.

To make the objectives, technical schemes, and effects of the present application more clear and specific, the present application is described in further detail below with reference to the embodiments in accompanying with the appending drawings. It should be understood that the specific embodiments described herein are merely for interpreting the present application and the present application is not limited thereto.

Figure 1:
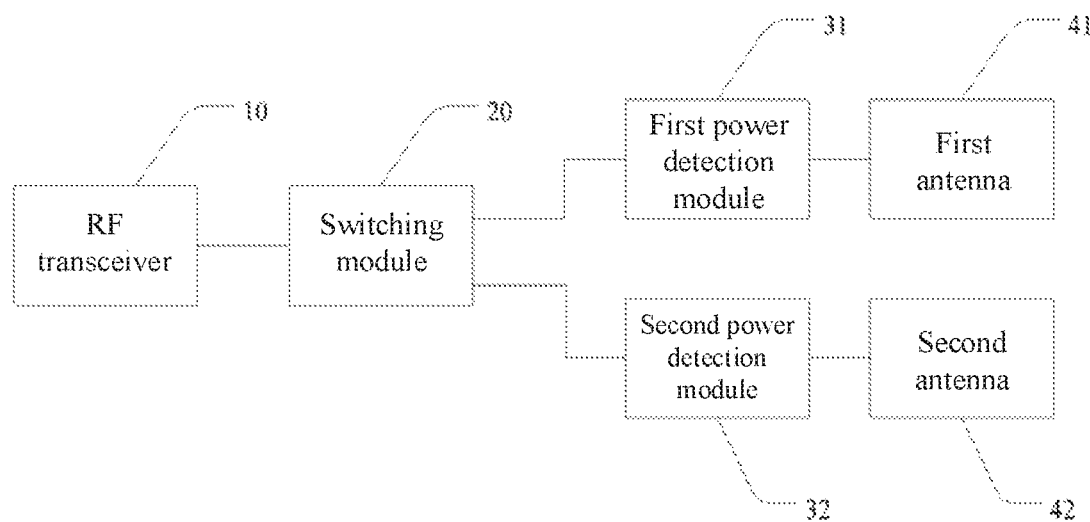
FIG. 1 is a structural block diagram illustrating a double-antenna RF power detection circuit provided according to an embodiment of the present application.

Referring to FIG. 1, the double-antenna RF power detection circuit provided in the present application includes a RF transceiver 10, a switching module 20, a first power detection module 31, a second power detection module 32, a first antenna 41 and a second antenna 42. The RF transceiver 10 connects to the switching module 20. The switching module 20 connects to the first antenna 41 via the first power detection module 31 and connects to the second antenna 42 via the second power detection module 32. The RF transceiver 10 outputs a RF signal to the switching module 20, the switching module 20 outputs the RF signal to the first power detection module 31 or the second power detection module 32 according to a received switching signal, the first power detection module 31 or the second power detection module 32 detects transmission power of the RF signal transmitted by the first antenna 41 or the second antenna 42 and gives a feedback to the RF transceiver 10.

The double-antenna RF power detection circuit provided in the present application can satisfy the demands on power detection in a case that the RF transceiver 10 has only one power detection pin but the frequencies are divided into two frequency bands which are transmitted using the first antenna 41 and the second antenna 42, respectively. Signal links are switched or selected by controlling the switching module 20 such that the RF signal is transmitted vis a corresponding path or channel and further, the first power detection module 31 or the second power detection module 32 detects actual transmission power of a current path or channel and gives a feedback to the RF transceiver 10. This solution not only satisfies the demands on signal transmission of two antennas but also can monitor in real time the transmission power of signals transmitted using different antennas, so as to adjust in real time the output power of the RF signal and improve the stability in outputting the RF signal.

Figure 2:
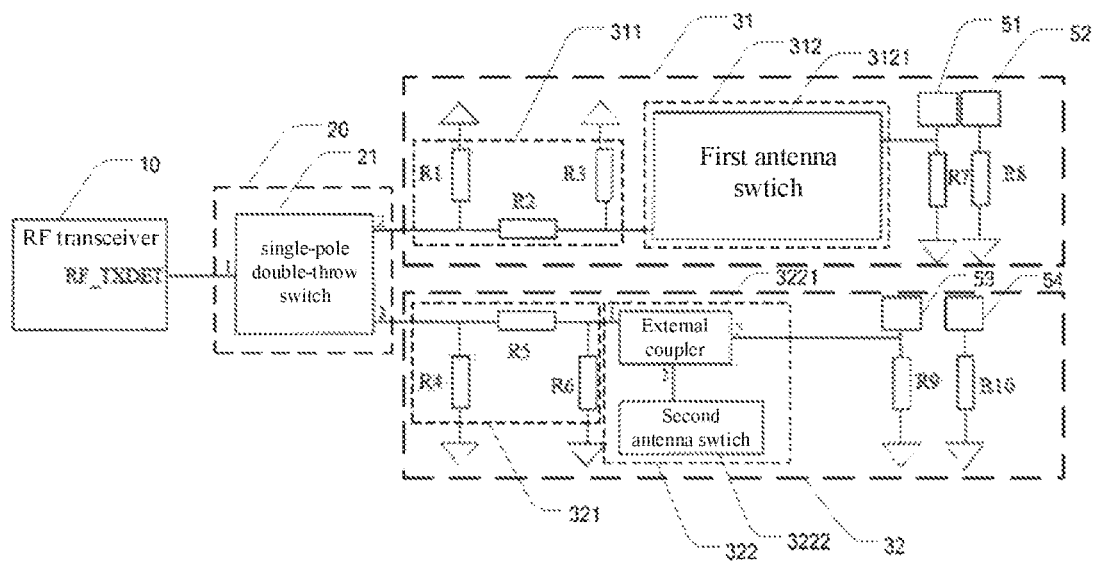
FIG. 2 is a diagram illustrating the principle of a double-antenna RF power detection circuit provided according to an embodiment of the present application.

Further, referring to FIG. 2 also, the switching module 20 includes a single-pole double-throw switch 21, a first end of which connects to a RF_TXDET end of the RF transceiver 10, a second end of which connects to the first power detection module 31 and a third end of which connects to the second power detection module 22. That is, in the present application, the switch of transmission paths or channels is realized by using the single-pole double-throw switch 21. Specifically, the single-pole double-throw switch 21 is controlled using a general-purpose input/output (GPIO) port, and receives a switching signal outputted by a central processing unit (CPU) to realize the path or channel switching. For example, the GPIO port is pulled up to switch to a path passing through the first power detection module 31 and the first antenna 41 and the GPIO port is pulled down to switch to a path passing through the second power detection module 32 and the second antenna 42, thereby realizing the switching between double-antenna RF links.

Specifically, the first power detection module 31 includes a first attenuating unit 311 and a first switching unit 312, the first attenuating unit 311 connects to the second end of the single-pole double-throw switch 21, the first switching unit 312 connects to the first antenna 41. When the switching module 20 outputs the RF signal to the first power detection module 31, that is, when the GPIO port is pulled up, the RF signal is outputted to the first antenna 41 via the first switching unit 312 and is propagated using the first antenna 41. Meanwhile, the first attenuating unit 311 feeds back an attenuated power for the RF signal such that the RF transceiver 10 obtain actual transmission power of the RF signal currently transmitted by the first antenna 41.

Correspondingly, the second power detection module 32 includes a second attenuating unit 321 and a second switching unit 322, the second attenuating unit 321 connects to the third end of the single-pole double-throw switch 21, the second switching unit 322 connects to the second antenna 42. When the switching module 20 outputs the RF signal to the second power detection module 32, that is, when the GPIO port is pulled down, the RF signal is outputted to the second antenna 42 via the second switching unit 312 and is propagated using the second antenna 42. Meanwhile, the second attenuating unit 321 feeds back an attenuated power for the RF signal such that the RF transceiver 10 obtain actual transmission power of the RF signal currently transmitted by the second antenna 42. That is, there is an attenuating feedback network correspondingly disposed in each transmission path or channel. In such a way, the transmission power is fed back in closed loop when signals are transmitted in current transmission path or channel.

Specifically, the first attenuating unit 311 includes a first resistor R1, a second resistor R2 and a third resistor R3, the first switching unit 312 includes a first antenna switch 3121 having a built-in coupler, the first power detection module 31 further includes a first grounded resistor R7 and a second grounded resistor R8; one end of the first resistor R1 connects to the second end of the single-pole double-throw switch 21 and one end of the second resistor R2, another end of the first resistor R1 is grounded; another end of the second resistor R2 connects to one end of the third resistor R3 and the first antenna switch 3121; another end of the third resistor R3 is grounded; the first antenna switch 3121 further connects to one end of the first grounded resistor R7 and a first elastic sheet 51 of the first antenna 41, one end of the second grounded resistor R8 connects to a second elastic sheet 52 cooperating with the first elastic sheet 51, both of another end of the first grounded resistor R7 and another end of the second grounded resistor R8 are grounded.

The second attenuating unit 321 includes a fourth resistor R4, a fifth resistor R5 and a sixth resistor R6, the second switching unit 322 includes an external coupler 3221 and a second antenna switch 3222, the second power detection module 32 further includes a third grounded resistor R9 and a fourth grounded resistor R10; one end of the fourth resistor R4 connects to the third end of the single-pole double-throw switch 21 and one end of the fifth resistor R5, another end of the fourth resistor R4 is grounded; another end of the fifth resistor R5 connects to one end of the sixth resistor R6 and a first end of the external coupler 3221; the sixth resistor R6 is grounded; a second end of the external coupler 3221 connects to the second antenna switch 3222, a third end of the external coupler 3221 connects to a first end of the third grounded resistor R9 and a third elastic sheet 53 of the second antenna 42, one end of the fourth grounded resistor R10 connects to a fourth elastic sheet 54 cooperating with the third elastic sheet 53, both of another end of the third grounded resistor R9 and another end of the fourth grounded resistor R10 are grounded.

In a case that the RF transceiver 10 has only one power feedback pin RF_TXDET and the transmission links are divided into two antenna paths for the transmission, different power feedback circuits are used for the transmission power monitoring since the two transmitting antennas are located at different places and their corresponding power detection and feedback links are different in wiring length on a printed circuit board (PCB), coupling ways and corresponding attenuation. [0046] In the present embodiment, there are two situations for the two transmission links. The first antenna switch 3121 is an antenna switch incorporated with a compatible coupler and accordingly, the attenuation coupling circuit directly connects to the antenna switch for monitoring in real time the transmission power of a port of the antenna switch. Instead, the second antenna switch 3222 does not have a compatible coupler. Accordingly, an external coupler 3221 is deployed in the second attenuating unit 321. Meanwhile, the RF signal passes through the antenna switch and then is conducted to the external coupler 3221, then is propagated by the antenna. The attenuation coupling circuit connects to the external coupler 3221 for power detection. This satisfies different needs of transmission power detection of antenna switches.

Figure 3:
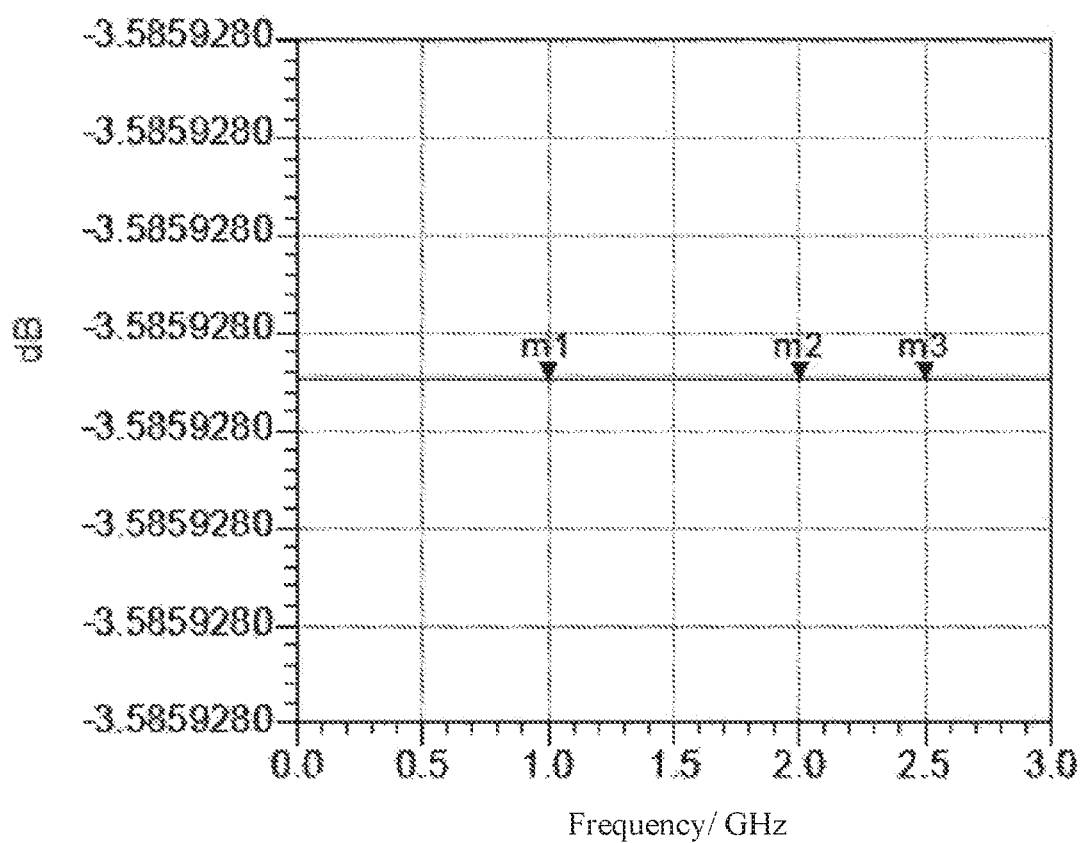
FIG. 3 is a diagram illustrating simulation of attenuation in a first practicing embodiment of a double-antenna RF power detection circuit provided according to an embodiment of the present application.
Figure 4:
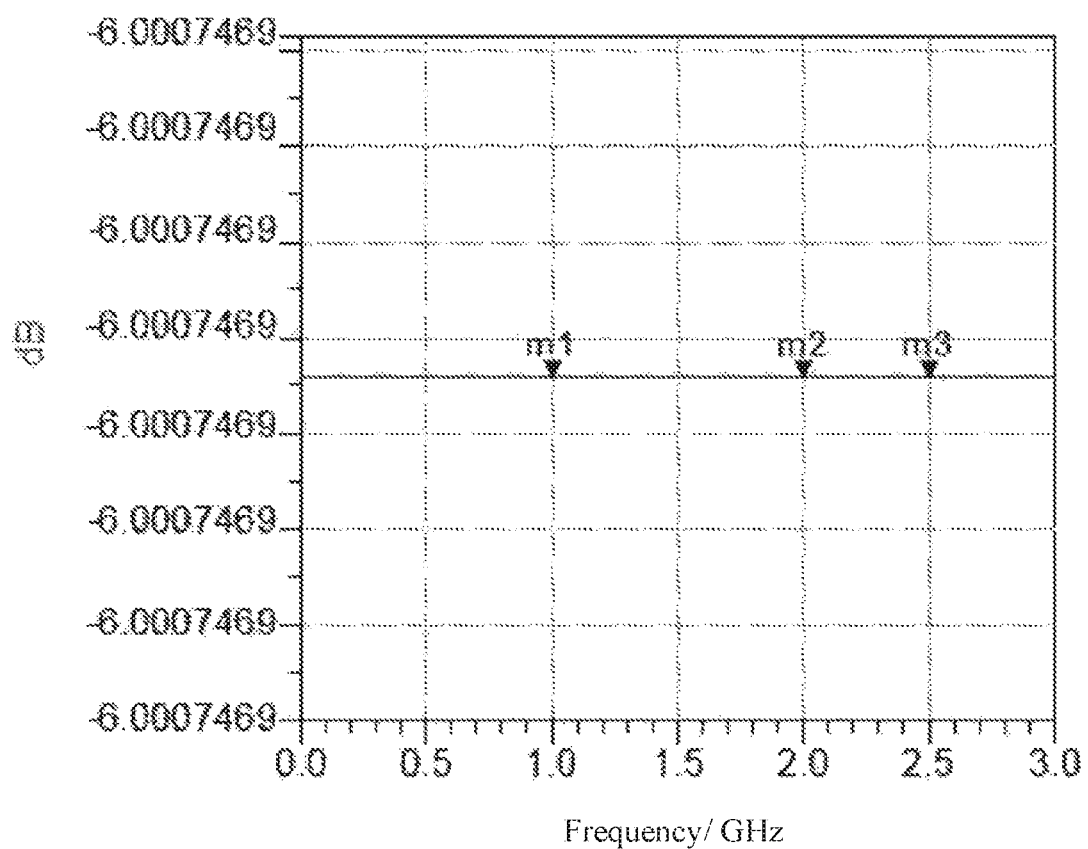
FIG. 4 is a diagram illustrating simulation of attenuation in a second practicing embodiment of a double-antenna RF power detection circuit provided according to an embodiment of the present application.

In concrete implementations, the resistance of the first resistor R1, the second resistor R2 and the third resistor R3 ranges from 10Ω to 250Ω. The resistance of the fourth resistor R4, the fifth resistor R5 and the sixth resistor R6 ranges from 10Ω to 250Ω. By adjusting the resistance of resistors of the attenuating units, a loss of feedback attenuation can be adjusted. As shown in FIG. 3 and FIG. 4, the two figures illustrate simulation of attenuating networks with 3.5 db and 6 db attenuation, respectively, for double-path transmission power detection. Specifically, when the first resistor R1, the second resistor R2 and the third resistor R3 are 150Ω, 150Ω and 10Ω respectively, all of the three sampling points m1 (1.0 GHz), m2 (2.0 GHz) and m3 (2.5 GHz) have 3.586 dB attenuation; when the first resistor R1, the second resistor R2 and the third resistor R3 are 220Ω, 220Ω and 51Ω respectively, all of the three sampling points m1 (1.0 GHz), m2 (2.0 GHz) and m3 (2.5 GHz) have 5.001 dB attenuation. Different attenuation adjustments can be achieved for cooperation with corresponding power detection links.

Based on the afore-described double-antenna RF power detection circuit, the present application correspondingly provides a double-antenna RF power detection apparatus including a printed circuit board (PCB), on which the afore-described double-antenna RF power detection circuit is disposed. Since the double-antenna RF power detection circuit has been described in detail in above context, it is not repeated herein.

The present application further provides a mobile terminal including the afore-described double-antenna RF power detection apparatus, which includes a PCB and a double-antenna RF power detection circuit disposed on the PCB.

Since the double-antenna RF power detection apparatus has been described in detail in above context, it is not repeated herein.

Above all, in the double-antenna RF power detection circuit, apparatus and mobile terminal provided in the present application, the double-antenna RF power detection circuit includes a RF transceiver, a switching module, a first power detection module, a second power detection module, a first antenna and a second antenna, wherein the first power detection module connects to the first antenna and the second power detection module connects to the second antenna; wherein the RF transceiver outputs a RF signal to the switching module, the switching module outputs the RF signal to the first power detection module or the second power detection module according to a received switching signal, the first power detection module or the second power detection module detects transmission power of the RF signal transmitted by the first antenna or the second antenna and gives a feedback to the RF transceiver. The present application can realize power detection of double-antenna RF links, not only satisfies the demands on signal transmission of two antennas but also can monitor in real time the transmission power of signals transmitted using different antennas, so as to adjust in real time the output power of the RF signal.

It should be understood that those of ordinary skill in the art may make equivalent modifications or variations according to the technical schemes and invention concepts of the present application, but all such modifications and variations should be within the appended claims of the present application.

What is claimed is:

1. A double-antenna radio frequency (RF) power detection circuit, comprising a RF transceiver, a switching module, a first power detection module, a second power detection module, a first antenna and a second antenna, wherein the first power detection module connects to the first antenna and the second power detection module connects to the second antenna; wherein the RF transceiver outputs a RF signal to the switching module, the switching module outputs the RF signal to the first power detection module or the second power detection module according to a received switching signal, the first power detection module or the second power detection module detects transmission power of the RF signal transmitted by the first antenna or the second antenna and gives a feedback to the RF transceiver, wherein the switching module comprises a single-pole double-throw switch, a first end of which connects to an end of the RF transceiver, a second end of which connects to the first power detection module and a third end of which connects to the second power detection module, wherein the first power detection module comprises a first attenuating unit and a first switching unit, and wherein when the switching module outputs the RF signal to the first power detection module, the RF signal is outputted to the first antenna by the first switching unit and power of the RF signal is fed back by the first attenuating unit.

2. The circuit according to claim 1, wherein the first attenuating unit connects to the second end of the single-pole double-throw switch and the first switching unit and the first switching unit connects to the first antenna.

3. The circuit according to claim 1, wherein the second power detection module comprises a second attenuating unit and a second switching unit, and wherein when the switching module outputs the RF signal to the second power detection module, the RF signal is outputted to the second antenna by the second switching unit and power of the RF signal is fed back by the second attenuating unit.

4. The circuit according to claim 3, wherein the second attenuating unit connects to the third end of the single-pole double-throw switch and the second switching unit and the second switching unit connects to the second antenna.

5. The circuit according to claim 3, wherein the second attenuating unit comprises a fourth resistor, a fifth resistor and a sixth resistor, the second switching unit comprises an external coupler and a second antenna switch, the second power detection module further comprises a third grounded resistor and a fourth grounded resistor;
one end of the fourth resistor connects to the third end of the single-pole double-throw switch and one end of the fifth resistor, another end of the fourth resistor is grounded; another end of the fifth resistor connects to one end of the sixth resistor and a first end of the external coupler; the sixth resistor is grounded; a second end of the external coupler connects to the second antenna switch, a third end of the external coupler connects to a first end of the third grounded resistor and a third elastic sheet of the second antenna, one end of the fourth grounded resistor connects to a fourth elastic sheet cooperating with the third elastic sheet, both of another end of the third grounded resistor and another end of the fourth grounded resistor are grounded.

6. The circuit according to claim 5, wherein resistance of the fourth resistor, the fifth resistor and the sixth resistor ranges from 10Ω to 250Ω.

7. The circuit according to claim 1, wherein the first attenuating unit comprises a first resistor, a second resistor and a third resistor, the first switching unit comprises a first antenna switch having a built-in coupler, the first power detection module further comprises a first grounded resistor and a second grounded resistor;
one end of the first resistor connects to the second end of the single-pole double-throw switch and one end of the second resistor, another end of the first resistor is grounded; another end of the second resistor connects to one end of the third resistor and the first antenna switch; another end of the third resistor is grounded; the first antenna switch further connects to one end of the first grounded resistor and a first elastic sheet of the first antenna, one end of the second grounded resistor connects to a second elastic sheet cooperating with the first elastic sheet, both of another end of the first grounded resistor and another end of the second grounded resistor are grounded.

8. The circuit according to claim 7, wherein resistance of the first resistor, the second resistor and the third resistor ranges from 10Ω to 250Ω.

9. A double-antenna radio frequency (RF) power detection apparatus, comprising a printed circuit board (PCB) and a double-antenna RF power detection circuit disposed on the PCB, the double-antenna RF power detection circuit comprising:
a RF transceiver, a switching module, a first power detection module, a second power detection module, a first antenna and a second antenna, the first power detection module connecting to the first antenna, the second power detection module connecting to the second antenna, wherein the RF transceiver outputs a RF signal to the switching module, the switching module outputs the RF signal to the first power detection module or the second power detection module according to a received switching signal, the first power detection module or the second power detection module detects transmission power of the RF signal transmitted by the first antenna or the second antenna and gives a feedback to the RF transceiver, wherein the switching module comprises a single-pole double-throw switch, a first end of which connects to an end of the RF transceiver, a second end of which connects to the first power detection module and a third end of which connects to the second power detection module, wherein the first power detection module comprises a first attenuating unit and a first switching unit, and wherein when the switching module outputs the RF signal to the first power detection module, the RF signal is outputted to the first antenna by the first switching unit and power of the RF signal is fed back by the first attenuating unit.

10. A mobile terminal, comprising a double-antenna radio frequency (RF) power detection apparatus comprising a printed circuit board (PCB) and a double-antenna RF power detection circuit disposed on the PCB, the double-antenna RF power detection circuit comprising:
a RF transceiver, a switching module, a first power detection module, a second power detection module, a first antenna and a second antenna, the first power detection module connecting to the first antenna, the second power detection module connecting to the second antenna, wherein the RF transceiver outputs a RF signal to the switching module, the switching module outputs the RF signal to the first power detection module or the second power detection module according to a received switching signal, the first power detection module or the second power detection module detects transmission power of the RF signal transmitted by the first antenna or the second antenna and gives a feedback to the RF transceiver, wherein the RF transceiver connects to the switching module, the switching module connects to the first antenna via the first power detection module and connects to the second antenna via the second power detection module, wherein the switching module comprises a single-pole double-throw switch, a first end of which connects to an end of the RF transceiver, a second end of which connects to the first power detection module and a third end of which connects to the second power detection module, wherein the first power detection module comprises a first attenuating unit and a first switching unit, and wherein when the switching module outputs the RF signal to the first power detection module, the RF signal is outputted to the first antenna by the first switching unit and power of the RF signal is fed back by the first attenuating unit.

11. The mobile terminal according to claim 10, wherein the first attenuating unit connects to the second end of the single-pole double-throw switch and the first switching unit and the first switching unit connects to the first antenna.

12. The mobile terminal according to claim 10, wherein the second power detection module comprises a second attenuating unit and a second switching unit, and wherein when the switching module outputs the RF signal to the second power detection module, the RF signal is outputted to the second antenna by the second switching unit and power of the RF signal is fed back by the second attenuating unit.

13. The mobile terminal according to claim 12, wherein the second attenuating unit connects to the third end of the single-pole double-throw switch and the second switching unit and the second switching unit connects to the second antenna.

14. The mobile terminal according to claim 12, wherein the second attenuating unit comprises a fourth resistor, a fifth resistor and a sixth resistor, the second switching unit comprises an external coupler and a second antenna switch, the second power detection module further comprises a third grounded resistor and a fourth grounded resistor;

one end of the fourth resistor connects to the third end of the single-pole double-throw switch and one end of the fifth resistor, another end of the fourth resistor is grounded; another end of the fifth resistor connects to one end of the sixth resistor and a first end of the external coupler; the sixth resistor is grounded; a second end of the external coupler connects to the second antenna switch, a third end of the external coupler connects to a first end of the third grounded resistor and a third elastic sheet of the second antenna, one end of the fourth grounded resistor connects to a fourth elastic sheet cooperating with the third elastic sheet, both of another end of the third grounded resistor and another end of the fourth grounded resistor are grounded.

15. The mobile terminal according to claim 10, wherein the first attenuating unit comprises a first resistor, a second resistor and a third resistor, the first switching unit comprises a first antenna switch having a built-in coupler, the first power detection module further comprises a first grounded resistor and a second grounded resistor;

one end of the first resistor connects to the second end of the single-pole double-throw switch and one end of the second resistor, another end of the first resistor is grounded; another end of the second resistor connects to one end of the third resistor and the first antenna switch; another end of the third resistor is grounded; the first antenna switch further connects to one end of the first grounded resistor and a first elastic sheet of the first antenna, one end of the second grounded resistor connects to a second elastic sheet cooperating with the first elastic sheet, both of another end of the first grounded resistor and another end of the second grounded resistor are grounded.

16. The mobile terminal according to claim 15, wherein resistance of the first resistor, the second resistor and the third resistor ranges from 10Ω to 250Ω.

* * * * *